US012631771B2

(12) United States Patent
Moore et al.

(10) Patent No.: US 12,631,771 B2
(45) Date of Patent: May 19, 2026

(54) HIERARCHICAL DEVICE-TO-DEVICE POSITIONING NETWORK

(71) Applicant: Tern AI LLC, Austin, TX (US)

(72) Inventors: Shaun Moore, Austin, TX (US);
Manuel Seelaus, Austin, TX (US);
Brett Harrison, Austin, TX (US)

(73) Assignee: TERN AI LLC, Austin, TX (US)

( * ) Notice: Subject to any disclaimer, the term of this patent is extended or adjusted under 35 U.S.C. 154(b) by 106 days.

(21) Appl. No.: 18/521,959

(22) Filed: Nov. 28, 2023

(65) Prior Publication Data

US 2025/0172703 A1     May 29, 2025

(51) Int. Cl.
G01S 19/51     (2010.01)
G01S 19/14     (2010.01)

(52) U.S. Cl.
CPC .............. G01S 19/51 (2013.01); G01S 19/14 (2013.01)

(58) Field of Classification Search
CPC .................................. G01S 19/51; G01S 19/14
See application file for complete search history.

(56) References Cited

U.S. PATENT DOCUMENTS

| | | | | |
|---|---|---|---|---|
| 11,069,082 B1 * | 7/2021 | Ebrahimi Afrouzi | .. | H04N 23/56 |
| 11,573,795 B1 * | 2/2023 | Itani | ...................... | G06F 9/3001 |
| 2004/0008138 A1 * | 1/2004 | Hockley, Jr. | ............ | G01S 19/51 |
| | | | | 342/464 |
| 2012/0015730 A1 * | 1/2012 | Watkins, Jr. | .......... | A63F 13/216 |
| | | | | 463/36 |
| 2012/0197518 A1 * | 8/2012 | Huseth | ................... | G06Q 10/00 |
| | | | | 701/300 |
| 2014/0067090 A1 * | 3/2014 | Lu | ...................... | G05B 19/4015 |
| | | | | 700/79 |
| 2016/0232677 A1 * | 8/2016 | Liao | ........................ | H04W 4/02 |
| 2017/0102467 A1 * | 4/2017 | Nielsen | ................... | G01S 19/47 |
| 2018/0087906 A1 * | 3/2018 | Kogan | .............. | G01C 21/1654 |
| 2021/0276574 A1 * | 9/2021 | Efrat Sela | ............ | B60W 10/20 |
| 2023/0161358 A1 * | 5/2023 | Ikhsanov | ................ | G01S 17/89 |
| | | | | 701/24 |

* cited by examiner

*Primary Examiner* — Keith D Bloomquist
(74) *Attorney, Agent, or Firm* — Maschoff Brennan

(57)     ABSTRACT

A method may include receiving, by a first computing device, a positional message from a second computing device. The positional message may indicate a position and an accumulated error of the indicated position corresponding to the second computing device. The accumulated error of the second computing device may be compared to an accumulated error of the first computing device in which the first and the second accumulated errors respectively represent degrees of uncertainty regarding respective positions and orientations of the first and second computing devices that increase over time. Responsive to the second accumulated error being less than the first accumulated error, a distance and an orientation of the first computing device relative to the second computing device may be assessed and a position of the first computing device in the environment may be updated based on the distance and the orientation.

18 Claims, 7 Drawing Sheets

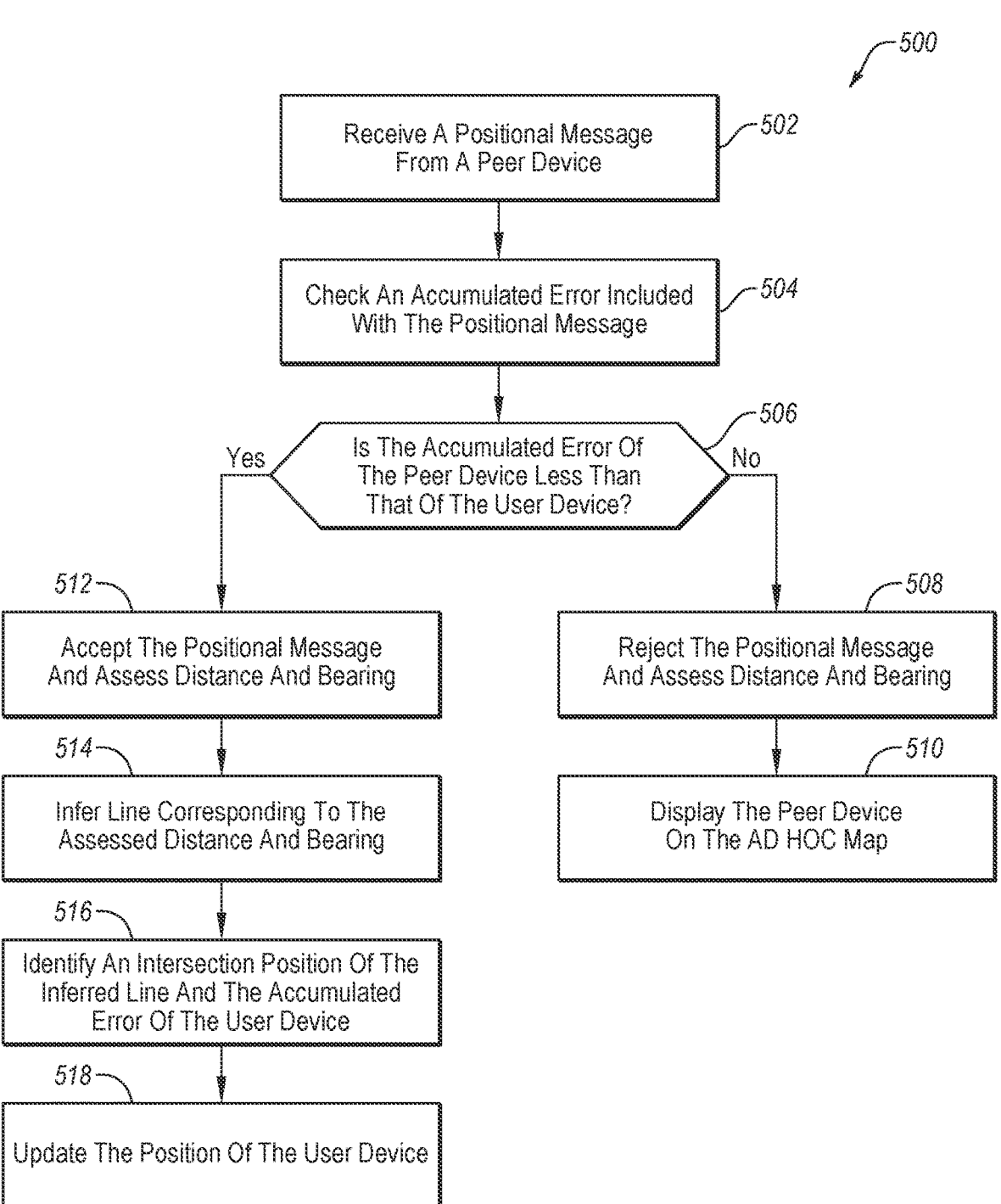

*500*

Receive A Positional Message
From A Peer Device ⟶ *502*

Check An Accumulated Error Included
With The Positional Message ⟶ *504*

*506*

Is The Accumulated Error Of
The Peer Device Less Than
That Of The User Device?

Yes        No

*512*
Accept The Positional Message
And Assess Distance And Bearing

*508*
Reject The Positional Message
And Assess Distance And Bearing

*514*
Infer Line Corresponding To The
Assessed Distance And Bearing

*510*
Display The Peer Device
On The AD HOC Map

*516*
Identify An Intersection Position Of The
Inferred Line And The Accumulated
Error Of The User Device

*518*
Update The Position Of The User Device

*FIG. 5*

HIERARCHICAL DEVICE-TO-DEVICE POSITIONING NETWORK

The present disclosure generally relates to a hierarchical device-to-device positioning network.

BACKGROUND

A position of a computing device in a particular environment may be measured for different purposes, such as navigation, tracking movement, or controlling positioning of the computing device. The Global Positioning System (GPS) may be implemented by the computing device to facilitate determining the absolute position of the computing device relative to GPS satellites. Additionally or alternatively, the relative position of the computing device may be determined in relation to one or more other reference points having known or fixed positions with respect to the particular environment.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include receiving, by a first computing device, a positional message from a second computing device. The positional message may indicate a position and an accumulated error of the indicated position corresponding to the second computing device. The accumulated error of the second computing device may be compared to an accumulated error of the first computing device in which the first and the second accumulated errors respectively represent degrees of uncertainty regarding respective positions and orientations of the first and second computing devices that increase over time. Responsive to the second accumulated error being less than the first accumulated error, a distance and an orientation of the first computing device relative to the second computing device may be assessed and a position of the first computing device in the environment may be updated based on the distance and the orientation.

In some embodiments, the positional message from the second computing device may further include an orientation of the second computing device relative to the first computing device. The orientation of the second computing device may be determined based on an angle of arrival or a time of arrival of a signal corresponding to the positional message as received by the first computing device.

In some embodiments, the positional message of the second computing device may further include a loaded navigation route vector that indicates which lane of a roadway the second computing device is currently moving along and plans to move along.

In some embodiments, the first accumulated error and the second accumulated error may be represented by three-dimensional volumes that are respectively centered on positions of the first computing device and the second computing device. The first accumulated error and the second accumulated error may increase over time during respective operation and movement of the first computing device and the second computing device. Additionally or alternatively, the first accumulated error of the first computing device may decrease according to the second accumulated error of the second computing device after updating the position of the first computing device.

In these and other embodiments, updating the position of the first computing device may include inferring a line originating from the second computing device. A length of the line may be determined according to the distance between the first computing device and the second computing device, and a width of the line may be determined according to the accumulated error associated with the second computing device. A direction of the line may be determined according to the orientation of the first computing device relative to the second computing device. The updated position of the first computing device may be set at an endpoint of the line.

Additionally or alternatively, the first computing device may receive a second positional message from a third computing device and a third positional message from a fourth computing device in which the third computing device has a third accumulated error and the fourth computing device has a fourth accumulated error. A second line originating from the third computing device and a third line originating from the fourth computing device may be inferred responsive to the third accumulated error and the fourth accumulated error each being lower than the first accumulated error. Setting the position of the first computing device may be updated as an intersection point between the line, the second line, and the third line within the three-dimensional volume corresponding to the first accumulated error of the first computing device. In these and other embodiments, the second computing device, the third computing device, and the fourth computing device may be selected from a plurality of computing devices according to respective accumulated errors corresponding to each computing device of the plurality.

In some embodiments, the first computing device and the second computing device may be smartphones.

In some embodiments, the first computing device and the second computing device may be infotainment systems respectively integrated with a first vehicle and a second vehicle.

According to an aspect of an embodiment, a system may include one or more processors and one or more non-transitory computer-readable storage media configured to store instructions that, in response to being executed, cause the system to perform operations. The operations may include receiving, by a first computing device, a positional message from a second computing device. The positional message may indicate a position and an accumulated error of the indicated position corresponding to the second computing device. The accumulated error of the second computing device may be compared to an accumulated error of the first computing device in which the first and the second accumulated errors respectively represent degrees of uncertainty regarding respective positions and orientations of the first and second computing devices that increase over time. Responsive to the second accumulated error being less than the first accumulated error, a distance and an orientation of the first computing device relative to the second computing device may be assessed and a position of the first computing device in the environment may be updated based on the distance and the orientation.

In some embodiments, the positional message from the second computing device may further include an orientation of the second computing device relative to the first computing device. The orientation of the second computing device may be determined based on an angle of arrival or a time of arrival of a signal corresponding to the positional message as received by the first computing device.

In some embodiments, the positional message of the second computing device may further include a loaded navigation route vector that indicates which lane of a roadway the second computing device is currently moving along and plans to move along.

In some embodiments, the first accumulated error and the second accumulated error may be represented by three-dimensional volumes that are respectively centered on positions of the first computing device and the second computing device. The first accumulated error and the second accumulated error may increase over time during respective operation and movement of the first computing device and the second computing device. Additionally or alternatively, the first accumulated error of the first computing device may decrease according to the second accumulated error of the second computing device after updating the position of the first computing device.

In these and other embodiments, updating the position of the first computing device may include inferring a line originating from the second computing device. A length of the line may be determined according to the distance between the first computing device and the second computing device, and a width of the line may be determined according to the accumulated error associated with the second computing device. A direction of the line may be determined according to the orientation of the first computing device relative to the second computing device. The updated position of the first computing device may be set at an endpoint of the line.

Additionally or alternatively, the first computing device may receive a second positional message from a third computing device and a third positional message from a fourth computing device in which the third computing device has a third accumulated error and the fourth computing device has a fourth accumulated error. A second line originating from the third computing device and a third line originating from the fourth computing device may be inferred responsive to the third accumulated error and the fourth accumulated error each being lower than the first accumulated error. Setting the position of the first computing device may be updated as an intersection point between the line, the second line, and the third line within the three-dimensional volume corresponding to the first accumulated error of the first computing device. In these and other embodiments, the second computing device, the third computing device, and the fourth computing device may be selected from a plurality of computing devices according to respective accumulated errors corresponding to each computing device of the plurality.

In some embodiments, the first computing device and the second computing device may be smartphones.

In some embodiments, the first computing device and the second computing device may be infotainment systems respectively integrated with a first vehicle and a second vehicle.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 5 is a flowchart of an example method of performing hierarchical device-to-device positioning according to one or more embodiments of the present disclosure.

DETAILED DESCRIPTION

Figure 1:
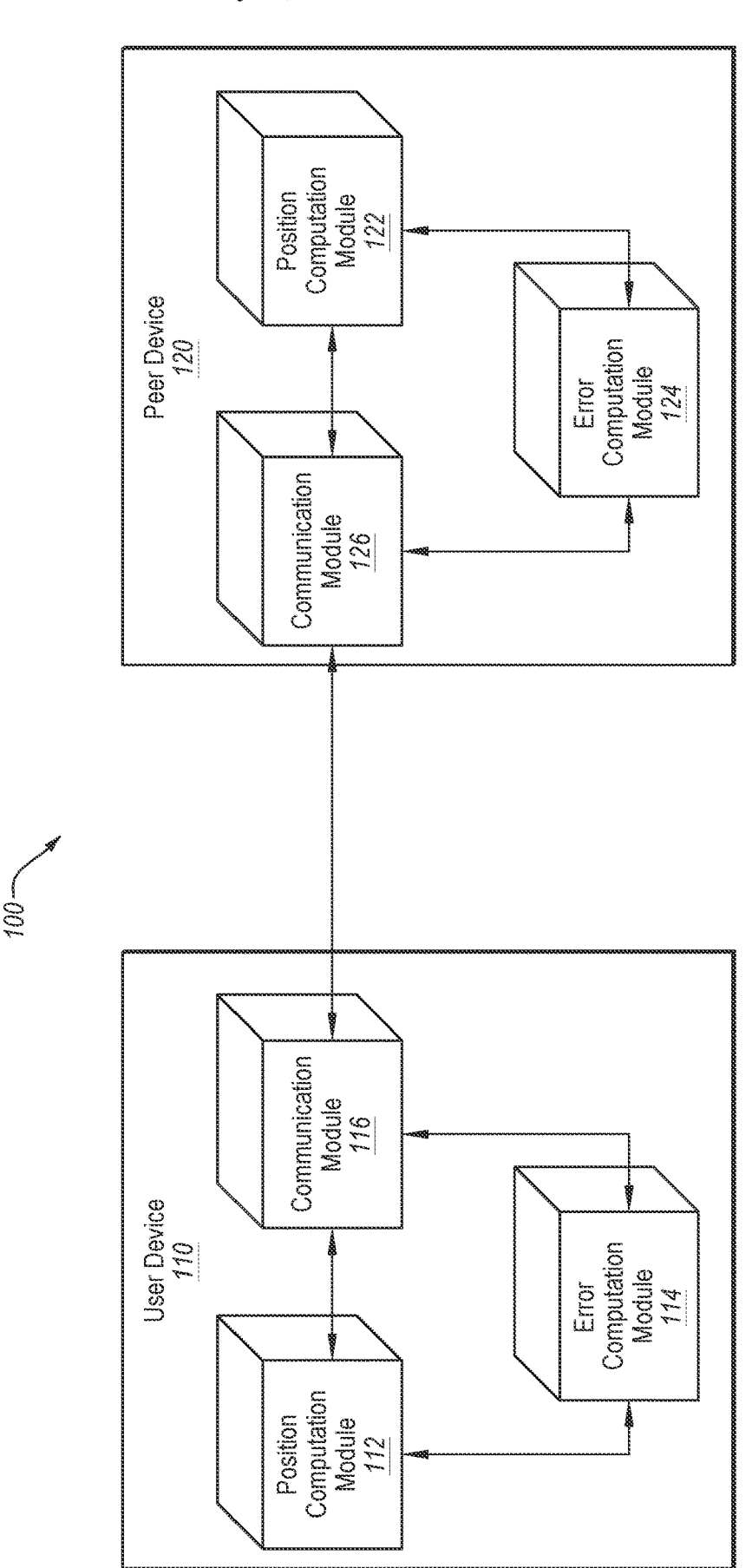
FIG. 1 is a diagram of an example block diagram of a system involving a hierarchical position computation between a user device and a peer device according to one or more embodiments of the present disclosure.

Navigation in an environment may involve identifying a starting position of an object and a target ending position of the object along with a route through the environment that allows the object to move from the starting position to the ending position. In some environments, the routes available for an object to take may be limited by aspects of the environments. For example, navigation for a vehicle may be limited by the roadways on which the vehicle may physically drive (e.g., due to vehicle size constraints or road closures) or legally drive (e.g., due to unidirectional traffic flows or road usage limitations). In the context of vehicular travel, a Global Positioning System (GPS) signal may be used to determine an absolute location of a vehicle, which may facilitate navigation by the vehicle within an environment. Additionally, use of GPS may assist the vehicle to navigate with respect to other vehicles within the same environment.

However, GPS navigation may include several disadvantages. GPS signals may be unreliable in situations in which a vehicle does not have clear access to the sky, such as in forested areas, densely urban settings, or under severe inclement weather conditions. Furthermore, determining a vehicle's location via GPS may not be sufficiently accurate for some applications because GPS navigation typically results in an approximately sixteen-feet range of accuracy in terms of determining a location of the vehicle using GPS navigation that may fluctuate depending on the signal reception available in a particular environment. In cases where more precise positioning is needed, an additional or alternative method of identifying a vehicle's position may be used.

Alternative processes of position identification within a particular environment that rely on determining relative positions of a vehicle rather than determining an absolute position via GPS tracking may involve their own drawbacks. Such positioning systems may rely on dead reckoning processes that compute the current position of a vehicle as an update to a previous known position of the vehicle based on estimated movement of the vehicle. Speedometers, gyroscopes, and other sensors may be implemented to collect information and facilitate the movement estimation for the vehicle. For example, a wheel counter may be configured to count the number of revolutions made by a wheel of a vehicle and estimate a distance traveled by the vehicle based on the number of revolutions.

Dead reckoning positioning systems may accumulate error over time as a vehicle moves through an environment.

User input may or may not be needed to offset or true out accumulated errors relating to positional data or computations by occasionally verifying the position and orientation of the vehicle. Additionally or alternatively, a computing system implementing a dead reckoning positioning system may true out accumulated errors upon the vehicle reaching a landmark, such as a monument, a road intersection, or particular business establishment, by using known position and orientation information about the landmark. However, such landmarks may or may not be present in the environment being navigated by the dead reckoning positioning system, or the landmarks may be sparsely located in the environment covered by the dead reckoning positioning system such that errors of the vehicle's navigation system accumulate and hinder operations of the vehicle.

The present disclosure may relate to a hierarchical device-to-device positioning network that may facilitate vehicular navigation without using GPS systems and with no user input or minimal user input regarding truing out positional errors associated with a particular computing device. One or more embodiments of the present disclosure may involve a decentralized communication network and system between local computing devices within an environment in which each of the local computing devices is configured to true out or otherwise decrease accumulated error of one or more other local computing devices included in the environment. The local computing devices included in the decentralized communication network may be configured to estimate their respective positions in real time and establish a hierarchical relationship with respect to communications between other local computing devices included in the decentralized communication network with information provided by local computing devices at higher hierarchical positions being considered as more reliable information. In some embodiments, the establishment of the hierarchical relationships between the local computing devices may depend on estimations of respective accumulated errors associated with each of the local computing devices in a particular environment.

The hierarchical device-to-device positioning network may provide a decentralized navigation and mapping system that may be accessible and useable by members of the hierarchical device-to-device positioning network when traditional navigation and mapping systems are not available. For example, the hierarchical device-to-device positioning network may be implemented as a back-up or augmented navigation and mapping service for GPS networks. Additionally or alternatively, the hierarchical device-to-device positioning network may provide a navigation system that facilitates inclusion of multiple different modes of movement. For example, while vehicles are referenced in relation to operations and features of the present disclosure, bicycles, aircrafts, pedestrians, and any other modes of transportation may be involved in the hierarchical device-to-device positioning network so long as a mobile computing device is included with a particular moving object that is intended to be included in the hierarchical device-to-device positioning network.

Embodiments of the present disclosure are explained with reference to the accompanying figures.

FIG. 1 is a diagram of an example block diagram of a system 100 involving a hierarchical position computation between a user device 110 and a peer device 120 according to one or more embodiments of the present disclosure. The system 100 may include the user device 110 and one or more peer devices 120 in which the user device 110 and the peer devices 120 (collectively, "the devices 110 and 120") are communicatively coupled with one another. In some embodiments, the devices 110 and 120 may respectively include position computation modules 112 and 122, error computation modules 114 and 124, and communication modules 116 and 126. The position computation module 112, the error computation module 114, and the communication module 116 of the user device 110 may be communicatively coupled with one another to facilitate determining and updating the position of the user device 110 while accounting for accumulated error in the position computation. Likewise, the position computation module 122, the error computation module 124, and the communication module 126 of the peer device 120 may be communicatively coupled with one another to facilitate determining and updating the position of the peer device 120 while accounting for accumulated error in the position computation.

In some embodiments, the position computation modules 112 and 122, the error computation modules 114 and 124, and the communication modules 116 and 126 (collectively referred to herein as "the computing modules") may include code and routines configured to enable a computing system to perform one or more operations. Additionally or alternatively, one or more of the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the devices 110 and 120 as described in further detail below and in relation to an example method 500 as described with respect to FIG. 5.

The devices 110 and 120 may be mobile computing devices with computing processing and communications capabilities that are located alongside a vehicle or other moving object about which movement and positioning information is to be collected. For example, the devices 110 and 120 may be smartphones in which one or more applications installed on the devices 110 and 120 may be configured to collect and analyze position-related or movement-related information about the devices 110 and 120. As an additional or alternative example, the devices 110 and 120 may be implemented with remotely or autonomously operated drones or other robotic machines. Parameters associated with movement of a particular drone may be measured by the user device 110 or the peer device 120 that is implemented with the particular drone during operation of the particular drone to facilitate performance of any tasks the particular drone is configured to execute. As an additional or alternative example, the devices 110 and 120 may be integrated with a suite of on-board electronic or hardware components of a vehicle, such as a car, a motorcycle, a boat, an airplane, a helicopter, or any other vehicles. In one or more particular examples, the devices 110 and 120 may be implemented as part of a vehicular infotainment system. In one or more particular examples, the devices 110 and 120 may be implemented as part of a component of a particular vehicle, such as a sensor unit coupled to an axle used in a vehicle. As an additional or alternative example, the devices 110 and 120 may be computing systems integrated with respective vehicles (e.g., autonomous vehicles). As additional or alternative examples, the devices 110 and 120 may be portable navigation units, laptops, smartwatches, or any other mobile computing device.

In these and other embodiments, the user device 110 and the peer device 120 may respectively be different types of devices. For example, the user device 110 may be implemented as part of a computing system that is integrated with a first vehicle, while the peer device 120 is a smartphone that is carried by a driver or passenger of a second, peer vehicle such that the position of the peer device 120 is a proxy representation of the position of the peer vehicle.

The position computation module 112 of the user device 110 may be configured to determine an absolute position of the user device 110 or a relative position of the user device 110 with respect to a particular environment. In some embodiments, the position computation module 112 may use a dead reckoning approach to determine the position of the user device 110 relative to a starting point of the user device 110. The position computation module 112 may initialize the position of the user device 110 according to a predetermined location (e.g., a garage associated with a vehicle that includes or implements the user device 110 or a parking spot) and compute a displacement of the user device 110 relative to the predetermined location based on estimations of movement parameters (e.g., speed and orientation) associated with the user device 110. In some embodiments, the user device 110 may include or be communicatively or physically coupled with a vehicle that includes sensors for collecting information related to movement of the vehicle. For example, the vehicle may include a speedometer that measures a speed of the vehicle, an accelerometer that measures an acceleration of the vehicle, a gyroscope that measures an orientation of the vehicle, a wheel odometer that measures a number of revolutions tires of the vehicle make over a particular time period, an altimeter that measures a height of the vehicle or a part of the vehicle, or any other sensors that may be configured to collect sensor data related to the vehicle's movement.

In some embodiments, the operations and computations of the position computation module 112 may be performed with or without communicative input from a Global Positioning System (GPS) or any other centralized positioning network. In other words, the position computation module 112, and the user device 110 by proxy, may be operated as an ad hoc and decentralized computing device with or without assistance from other established computing systems, mapping systems, or any other infrastructure for determining a particular position. Additionally or alternatively, the position computation module 112 may utilize an inertial navigation system, a terrain referenced navigation system, a computer vision navigation system, or any other types of alternative positioning systems in addition or as an alternative to the dead reckoning approach or using a GPS.

The collected sensor data may be communicated to the position computation module 112, which may determine a present position of the vehicle to which the user device 110 is communicatively or physically coupled. Additionally or alternatively, the position computation module 112 may be configured to compute a path of past motion of the vehicle (e.g., based on wheel odometry and gyroscopic orientation information) or a trajectory of projected future motion of the vehicle (e.g., based on gyroscopic orientation and acceleration information). In some embodiments, the position computation module 112 may compute positional- and movement-related values associated with the user device 110 and the vehicle corresponding to the user device 110 using one or more kinematics formulae.

As the user device 110 moves, error may accumulate in the computations of the position computation module 112 such that the positional computations of the position computation module 112 may or may not accurately represent a position or orientation of the user device 110. The error computation module 114 may be configured to compute an error associated with the position computations performed by the position computation module 112. In some embodiments, the error of the position computation module 112 may originate from computational estimation errors that compound over time. Over a particular duration of time, the position computation module 112 may output positional estimations that are predicated on previously outputted positional estimations, which may or may not result in a difference between the outputted positional estimation and the true position of the user device 110 increasing over time.

In these and other embodiments, the error computation module 114 may be configured to output a quality score indicative of a magnitude of the error accumulated by a particular computation of the position computation module 112. For example, the error computation module 114 may output a score value ranging from one to ten in which a greater score value (or alternatively, a lower score value) indicates more accumulated error. Additionally or alternatively, the error computation module 114 may be configured to output a time value that indicates how much time has elapsed since the errors associated with the computations of the position computation module 112 have been trued out as described in further detail in relation to an example operating environment 200 of FIG. 2 and in relation to an example error-truing process of FIG. 4.

Additionally or alternatively, the error computation module 114 may be configured to output a tolerance value or a range of positions corresponding to a tolerance value that indicates possible positions of the user device 110 based on the position output by the position computation module 112. The tolerance value may increase over time as the error accumulates for the user device 220. In some embodiments, the tolerance value, representing the range of possible positions of the user device 110, may be visually represented by a bounding box. The bounding box may be a two-dimensional or three-dimensional virtual boundary centered on the estimated position of the user device 110 or another object corresponding to the estimated position of the user device 110 (e.g., a vehicle). The bounding box may represent possible positions that the user device 110 may be located with consideration for error accumulated during computation of the estimated position of the user device 110. In some embodiments, the bounding box may be computed based on a first parameter indicating a computed position of the user device 110 and a second parameter indicating an accumulated error of the computed position in which the accumulated error is a tolerance value. The computed position of the user device 110 may be designated as an estimated center point and the tolerance value may be used to compute a two-dimensional or three-dimensional range extending in one or more directions from the estimated center point.

The user device 110 may include a communication module 116 that facilitates receiving information from and transmitting information to other computing devices, such as the peer device 120. The communication module 116 may be configured to use one or more communication protocols, such as BLUETOOTH®, BLUETOOTH® Low Energy (BLE), ultra-wideband (UWB), near-field communication (NFC), IEEE 802.15.4, wide-area network (WAN), low-power WAN (LPWAN), Wi-Fi, Wi-Max, or any other communication protocols, to interact with any other computing devices within a communication range of the user device 110. The peer device 120, which may be configured to perform the same or similar operations as the user device 110 with respect to identifying and updating using the position computation module 122 and the error computation module 124, may be configured to communicate with the user device 110 via the communication module 126. Additionally or alternatively, the user device 110 or the peer device 120 may be configured to communicate with other peer devices that include communication modules that are the same as or similar to the communication modules 116 and 126.

In some embodiments, the communication module 116 may be configured to perform short-range communication within a range of five meters, ten meters, fifteen meters, twenty meters, thirty meters, fifty meters, or at some other distance such that the user device 110 to which the communication module 116 corresponds is capable of communicating within a range of other vehicles on a roadway system that may affect driving and navigation of the vehicle with which the user device 110 is associated. For example, the communication module 116 may be configured to use the BLUETOOTH® communication protocol, among other communication protocols, to receive signals from and transmit signals to other computing devices configured to communicate using the BLUETOOTH® communication protocol within range of the user device 110. In these and other embodiments, the communication module 116 may be configured to automatically detect another computing device configured to use BLUETOOTH® communications within the communication range of the user device 110 and communicate a positional message with (e.g., transmit a positional message to or receive a positional message from) the detected computing device in which the positional message specifies a position and an accumulated error associated with a computing device. Additionally or alternatively, the communication module 116 may be configured to only communicate with another computing device within the communication range of the user device 110 in which the other computing device includes one or more particular software applications, such as a particular app on a smartphone, while ignoring any other incoming signals.

In some embodiments, the communication module 116 may be configured to selectively communicate with computing devices inside of a communication range of the communication module 116. Filtering of which computing devices the communication module 116 may communicate with may be based on receiving a first communication message declaring an accumulated error of the transmitting computing device from each computing device in the communication range of the communication module 116. The communication module 116 may filter out or otherwise ignore further communications with computing devices that include the same or a greater degree of error accumulation than the user device 110 implementing the communication module 116 for a predetermined period of time.

In some embodiments, whether selective communication by the communication module 116 is implemented may be dynamically triggered based on the environment in which the user device 110 operates. For example, the selective communication process may be triggered by the communication module 116 determining that the number of computing devices in the vicinity of the user device 110 is greater than a threshold number based on a communication frequency between the user device 110 and other computing devices with respect to the first communication messages. After the number of computing devices in the vicinity of the user device 110 exceeds the threshold number, communications may be limited to those computing devices that include less accumulated error (i.e., computing devices that are more confident in their associated positions) than the user device 110. Additionally or alternatively, the communication module 116 may be configured to decrease a communication range responsive to determining that the number of computing devices in the vicinity of the communication module 116 is greater than the threshold number. Additionally or alternatively, the communication module 116 may be configured to communicate for a particular period of time with neighboring computing devices (e.g., communicate for five seconds, ten seconds, fifteen seconds, thirty seconds, one minute, two minutes, or any other intervals of time) responsive to determining that the number of computing devices in the vicinity of the communication module 116 is greater than the threshold number.

Modifications, additions, or omissions may be made to the system 100 without departing from the scope of the present disclosure. For example, the designations of different elements in the manner described is meant to help explain concepts described herein and is not limiting. For instance, in some embodiments, the user device 110, the peer device 120, the position computation modules 112 and 122, the error computation modules 114 and 124, and the communication modules 116 and 126 are delineated in the specific manner described to help with explaining concepts described herein but such delineation is not meant to be limiting. Further, the system 100 may include any number of other elements or may be implemented within other systems or contexts than those described.

Figure 2:
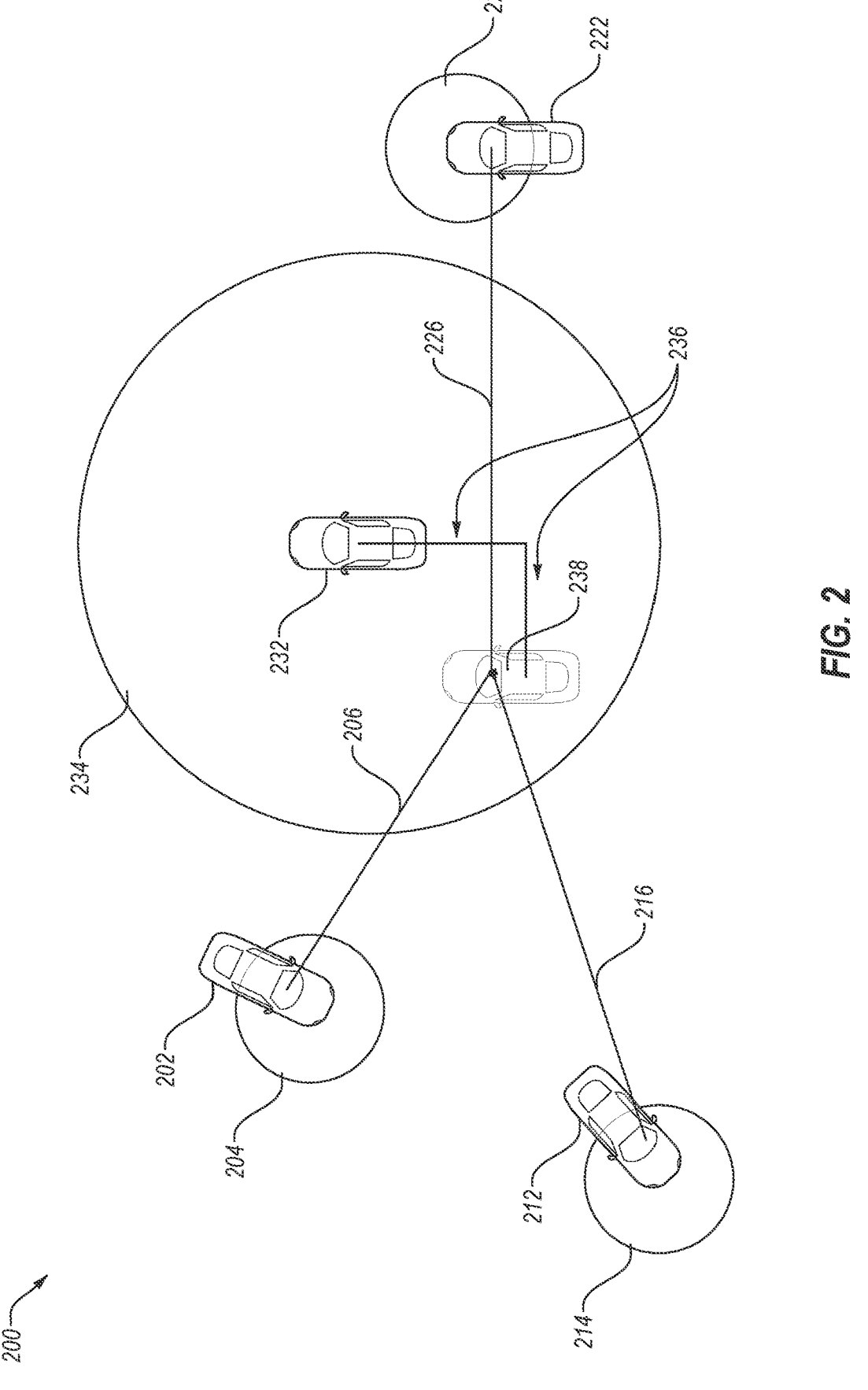
FIG. 2 illustrates an example triangulation process according to one or more embodiments of the present disclosure.

FIG. 2 illustrates an example triangulation process in an example operating environment 200 according to one or more embodiments of the present disclosure. The environment 200 may include a first peer vehicle 202, a second peer vehicle 212, a third peer vehicle 222, and a user vehicle 232 (collectively the "vehicles"). Each of the vehicles may include a bounding box that represents a respective accumulated error corresponding to each of the vehicles. For example, the first peer vehicle 202 may include a first bounding box 204, the second peer vehicle 212 may include a second bounding box 214, and the third peer vehicle 222 may include a third bounding box 224.

As illustrated in the environment 200, the user vehicle 232 may include a fourth bounding box 234 that is larger than the first bounding box 204, the second bounding box 214, or the third bounding box 224, indicating that the user vehicle 232 includes a greater accumulated error than the first peer vehicle 202, the second peer vehicle 212, or the third peer vehicle 222. The greater accumulated error of the user vehicle 232 may represent a greater degree of uncertainty regarding the position of the user vehicle 232 as determined by a user device (e.g., the user device 110 as described with respect to the system 100) associated with the user vehicle 232 due to compounding errors during determination of the estimated position of the user vehicle 232 over time.

Each of the peer vehicles 202, 212, and 222 may be configured to communicate with the user vehicle 232 via positional messages that specify a respective distance and a respective orientation of the peer vehicles 202, 212, and 222 relative to the user vehicle 232. Additionally or alternatively, the user vehicle 232 may compute one or more parameters based on the information provided in the positional messages. For example, the orientation the peer vehicles 202, 212, or 222 may not be described in the positional messages. However, the orientations of the peer vehicles 202, 212, and 222 may be determined based on a signal strength of a signal corresponding to one or more of the positional messages as received by the user vehicle 232 (e.g., a received signal strength indicator). For example, the first peer vehicle 202 may send a series of positional messages to the user vehicle 232 in which each subsequent positional message includes increasingly stronger signal strengths, indicating that the first peer vehicle 202 is approaching the user vehicle 232. As an additional or alternative example, the second peer vehicle 212 may send a series of positional messages to the user vehicle 232 in which each of the positional messages includes the same or similar signal strengths, indicating that the second peer vehicle 212 is traveling in the same direction and at the same or a similar speed as the user vehicle 232. Additionally or alternatively, the user vehicle 232 may determine relative information about the peer vehicles 202, 212, and 222 based on a time of arrival or a time difference of arrival of positional messages received from the peer vehicles 202, 212, and 222. Additionally or alternatively, the user vehicle 232 may determine relative information about the peer vehicles 202, 212, and 222 based on an angle of arrival of signals from the peer vehicles 202, 212, and 222.

In some embodiments, the positional message may provide additional information that facilitate determining a relative position of the peer vehicles 202, 212, and 222 in environments that may be difficult to navigate the user vehicle 232 with only information regarding the positions, the orientations, or the speeds of the peer vehicles 202, 212, and 222. For example, the positional message may include a loaded navigation route vector that indicates which lane of a roadway the peer vehicles 202, 212, and 222 are currently moving along or plan to move along.

As illustrated in the environment 200, the first peer vehicle 202 may send a first positional message 206 to the user vehicle 232. The second peer vehicle 212 may send a second positional message 216 to the user vehicle 232, and the third peer vehicle 222 may send a third positional message 226 to the user vehicle 232. In some embodiments, the position of the user vehicle 232 may be determined based on triangulating a position according to the positional messages 206, 216, and 226. For example, an intersection point 238 of the first positional message 206, the second positional message 216, and the third positional message 226 may specify the position of the user vehicle 232.

The position of the user vehicle 232 as determined by an on-board user device associated with the user vehicle 232 (i.e., a self-determined position) may differ from the specified position of the user vehicle 232 according to the intersection point 238 in some situations. In some embodiments, the discrepancy between a self-determined position of the user vehicle 232 (e.g., by a position computation module that is the same as or similar to the position computation modules 112 and 122 of the system 100 implemented on a mobile computing device included on board the user vehicle 232 or integrated with the user vehicle 232 itself) and the intersection point 238 may be reconciled based on the bounding boxes 204, 214, 224, and 234. In situations in which the bounding boxes 204, 214, and 224 corresponding to the peer vehicles 202, 212, and 222 are larger than the bounding box 234 corresponding to the user vehicle 232, the position information related to the peer vehicles 202, 212, and 222 may be less reliable than the self-determined position information related to the user vehicle 232 due to greater accumulated error associated with the peer vehicles 202, 212, and 222. Thus, the intersection point 238 determined based on the three positional messages

206, 216, and 226 may be less likely than the self-determined position to represent a true position of the user vehicle 232.

In some situations, the bounding boxes 204, 214, and 224 may be smaller than the bounding box 234 of the user vehicle 232 such that the self-determined position of the user vehicle 232 may be considered less reliable than the intersection point 238. In these and other situations, an offset 236 representing a distance and orientation of the self-determined position of the user vehicle 232 relative to the intersection point 238 may be computed. The self-determined position of the user vehicle 232 may be updated based on the offset 236, and the accumulated error associated with the user vehicle 232 may be decreased based on the accumulated errors of the peer vehicles 202, 212, and 222 involved in the determination of the intersection point 238.

Although the triangulation process is described in the environment 200 with respect to the reliability of the bounding boxes 204, 214, and 224, it may be appreciated that other factors may be considered in determining whether a particular accumulated error reported alongside a particular positional message may be accepted or rejected by a user device. In some embodiments, an anonymous reputation system may be included in which computing devices included in a hierarchical device-to-device positioning network are assigned respective reputation values corresponding to the reliability of information provided by each of the computing devices. For example, a particular computing device known to have poor wireless communication connectivity or otherwise frequently provides erroneous information may be assigned a lower reputation value such that accumulated error values reported by the particular computing device are increased by a particular factor to account for the less reliable information typically provided by the particular computing device. Additionally or alternatively, computing devices corresponding to slower moving vehicles, constantly moving vehicles, or other vehicles for which the positions and orientations may be simpler to compute (e.g., trains moving along guided tracks) may be considered higher priority than other vehicles not included in such classifications.

Modifications, additions, or omissions may be made to the environment 200 without departing from the scope of the present disclosure. For example, the designations of different elements in the manner described is meant to help explain concepts described herein and is not limiting. For instance, in some embodiments, the peer vehicles 202, 212, and 222; the bounding boxes 204, 214, 224, and 234; the positional messages 206, 216, and 226; the user vehicle 232; the offset 236; and the intersection point 238 are delineated in the specific manner described to help with explaining concepts described herein but such delineation is not meant to be limiting. Further, the environment 200 may include any number of other elements or may be implemented within other systems or contexts than those described.

Figure 3A:
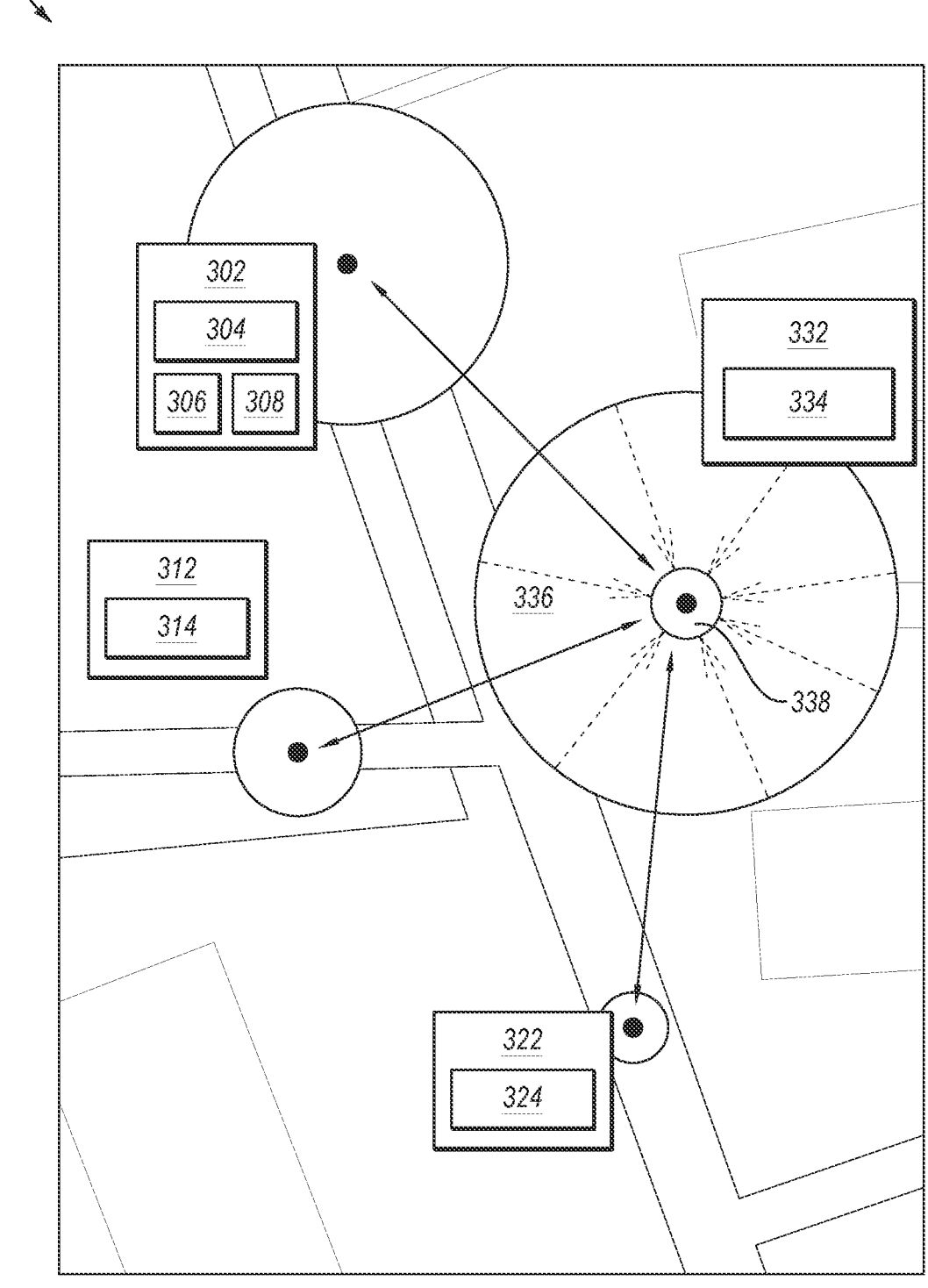
FIGS. 3A and 3B illustrates an example operating environment involving a hierarchical device-to-device positioning network according to one or more embodiments of the present disclosure.
Figure 3B:
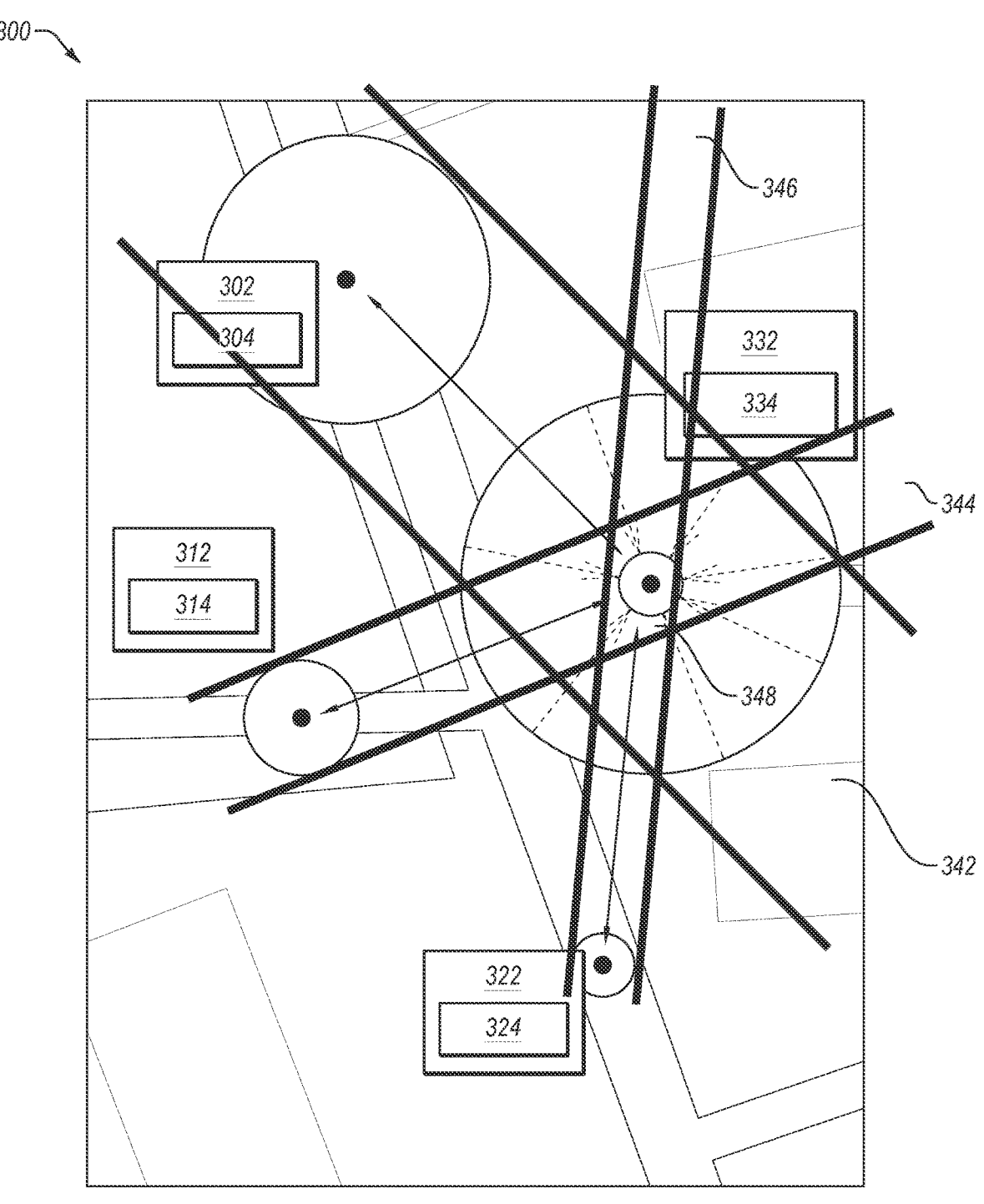

FIGS. 3A and 3B illustrates an example operating environment 300 involving a hierarchical device-to-device positioning network according to one or more embodiments of the present disclosure. As illustrated in FIG. 3A, the environment 300 may include four vehicles with each of the vehicles including a respective computing device 302, 312, 322, and 332 that may be the same as or similar to the user device 110 described in relation to the system 100 of FIG. 1. That is, the computing devices 302, 312, 322, and 332 may each include position computation modules, error computation modules, and communication modules such that each of the computing devices 302, 312, 322, and 332 may be configured to estimate their own positions, determine their own accumulated errors, and communicate with other computing devices. The vehicles may include their respective bounding boxes 304, 314, 324, and 334 representing varying degrees of uncertainty as indicated by the sizes of the bounding boxes 304, 314, 324, and 334. Additionally or alternatively, the computing devices 302, 312, 322, and 332 may respectively be configured to use one or more communication protocols, such as a BLUETOOTH® protocol 306 or an UWB protocol 308.

A fourth vehicle associated with a fourth computing device 332 may receive positional messages from a first vehicle associated with a first computing device 302, a second vehicle associated with a second computing device 312, and a third vehicle associated with a third computing device 322. The fourth vehicle may initially include a bounding box that includes a first size 336. As illustrated in the environment 300, the first size 336 of the bounding box may be relatively large with respect to a first bounding box 304 associated with a first computing device 302 and a first vehicle, a second bounding box 314 associated with a second computing device 312 and a second vehicle, and a third bounding box 324 associated with a third computing device 322 and a third vehicle. Comparatively, the third computing device 322 and the third vehicle may be providing the most precise position information relative to the first computing device 302, the second computing device 312, and the fourth computing device 332 because the third bounding box 324 is smaller than the first bounding box 304, the second bounding box 314, and the first size 336 of the fourth bounding box 334. Similarly, the first computing device 302 and the fourth computing device 332 may be providing the least precise position information based on the sizes of the first bounding box 304 and the first size 336 of the fourth bounding box 334.

Receiving positional messages from the first computing device 302, the second computing device 312, and the third computing device 322 may allow the fourth computing device 332 to verify the position of the fourth vehicle using a triangulation process. Because one of the positional messages received by the fourth computing device 332 is associated with the third computing device 322, which includes a relatively smaller bounding box 324, the fourth bounding box 334 may decrease from the first size 336 to a second size 338 that corresponds to the size of the third bounding box 324. In these and other embodiments, the size of the fourth bounding box 334 may be decreased to represent that the error associated with the fourth bounding box 334 has been trued out by the error associated with the third bounding box 324. In other words, the reliability of the position estimated for the fourth vehicle by the fourth computing device 332 may be considered as reliable as the estimation of the position related to the positional message of the third computing device 322 responsive to the fourth computing device 332 estimating the position of the fourth vehicle using information from the third computing device 322.

FIG. 3B illustrates the environment 300 in which updating a position of the fourth vehicle corresponding to the fourth bounding box 334 may be determined based on a first lane 342 corresponding to the first bounding box 304, a second lane 344 corresponding to the second bounding box 314, and a third lane 346 corresponding to the third bounding box 324. A region 348 that represents an updated position of the fourth computing device 332 may be identified based on an intersection between the first lane 342, the second lane 344, and the third lane 346.

Because the bounding boxes 304, 314, and 324 represent the two-dimensional areas or three-dimensional volumes in which the computing devices 302, 312, and 322 respectively may be located, using the center lines of the bounding boxes 304, 314, and 324 to estimate the position of the fourth computing device 332 and the fourth bounding box 334 may or may not be accurate. In some embodiments, the lanes 342, 344, and 346 may respectively represent two-dimensional area projections or three-dimensional volume projections of the computing devices 302, 312, and 322. Using the lanes 342, 344, and 346 to estimate an updated position of the fourth computing device 332 may result in generating the region 348, which may be a two-dimensional area or a three-dimensional volume, that represents a space in which the fourth computing device 332 may be located. As described in FIG. 3A, the fourth computing device 332 may include the fourth bounding box 334 sized according to the computing device that includes the lowest reported accumulated error of the computing devices 302, 312, and 322, which may be the third bounding box 324 associated with the third computing device 322 as illustrated in FIG. 3B. In some embodiments, the position of the fourth computing device 332 may be updated as being a center point of the region 348. Additionally or alternatively, the position of the fourth computing device 332 may be self-reported by the fourth computing device 332, and responsive to determining that the self-reported position of the fourth computing device 332 is within the region 348, the self-reported position may be used as the updated position of the fourth computing device 332. Additionally or alternatively, the fourth bounding box 334 may be shaped to match the shape of the region 348 as formed by the intersection of the lanes 342, 344, and 346.

In some embodiments, the sizes of the lanes 342, 344, and 346 may be computed based on the estimated or reported positions and associated accumulated errors of the respective computing devices 302, 312, and 322. Consequently, the computing devices 302, 312, and 322 sending positional messages to the fourth computing device 332 that include the respective positions of the computing devices 302, 312, and 322 and a tolerance value corresponding to the respective accumulated errors of the computing devices 302, 312, and 322 may be sufficient for computing the region 348. In other words, widths of the lanes 342, 344, and 346 may depend on the respectively accumulated errors of the computing devices 302, 312, and 322.

Modifications, additions, or omissions may be made to the environment 300 without departing from the scope of the present disclosure. For example, the designations of different elements in the manner described is meant to help explain concepts described herein and is not limiting. For instance, in some embodiments, the first computing device 302, the second computing device 312, the third computing device 322, and the fourth computing device 332 are delineated in the specific manner described to help with explaining concepts described herein but such delineation is not meant to be limiting. Further, the environment 300 may include any number of other elements or may be implemented within other systems or contexts than those described.

Figure 4:
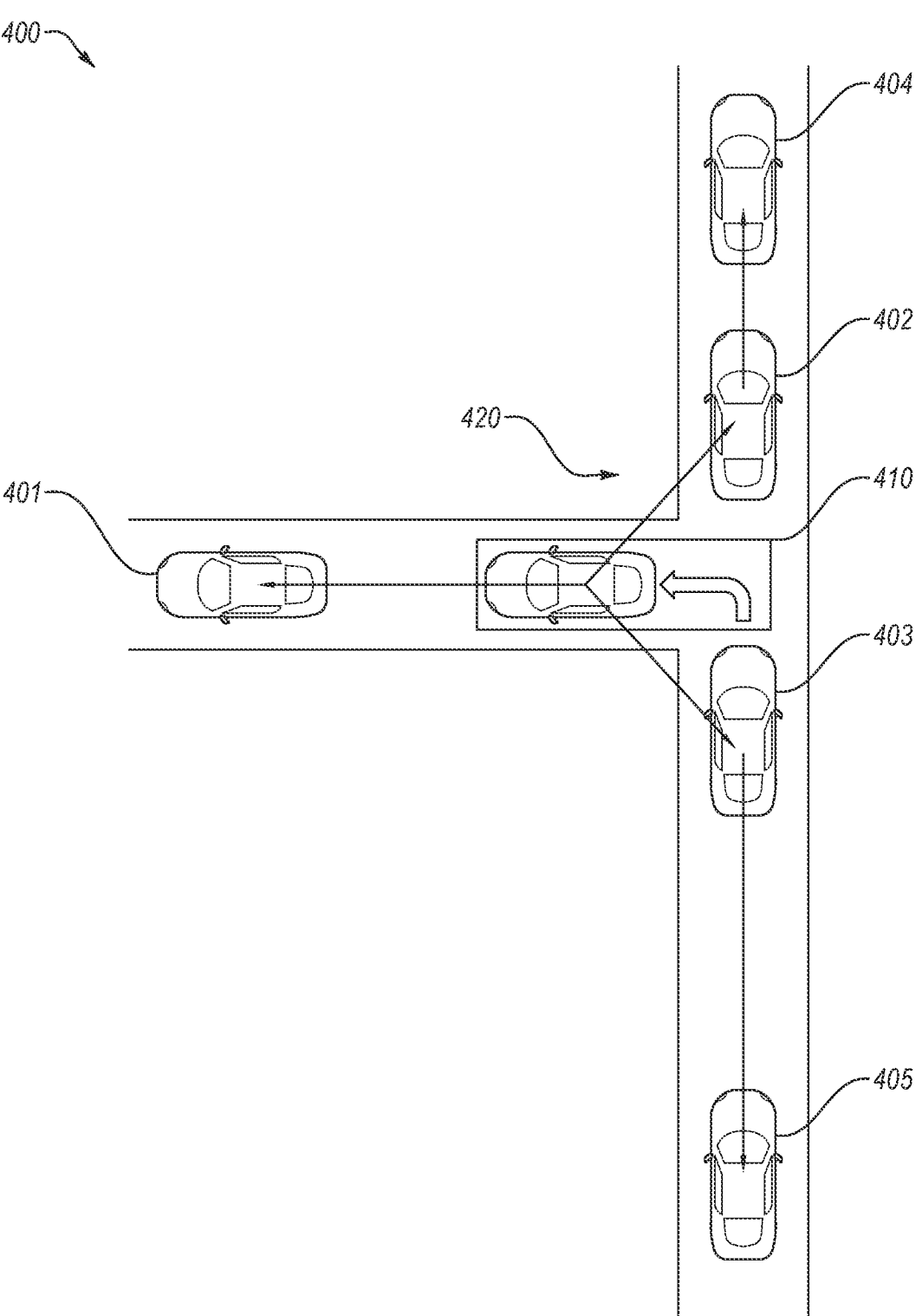
FIG. 4 illustrates an example error-truing process according to one or more embodiments of the present disclosure.

Additionally or alternatively, an accumulated error associated with a particular computing device and a particular vehicle may be updated based on specific driving events. For example, FIG. 4 illustrates an example error-truing process in an example operating environment 400 according to one or more embodiments of the present disclosure. The environment 400 may include vehicles 401-405 that are associated with peer devices and a vehicle 410 that is associated with a user device. The vehicles 401-405 and 410 may be operating (e.g., driving) on a public roadway that includes a high-confidence feature 420.

In some embodiments, the high-confidence feature 420 may represent a landmark or other object with reliable positioning information. For example, the high-confidence feature 420 may include particular roadway features (e.g., turns, speed zones, or roundabouts). A particular vehicle interacting with the high-confidence feature 420 may result in determining an updated position of the particular vehicle and truing out the error associated with the particular vehicle because the position of the high-confidence feature 420 is considered a known parameter or value. Additionally or alternatively, the high-confidence feature 420 may be stationary objects that have known positions and are configured to communicate with one or more computing devices included in a hierarchical device-to-device positioning network. For example, a traffic sign (e.g., a stop sign, a yield sign, or a traffic light installation) may be installed with a communication module that is configured to operate the same as or similar to the communication modules 116 and 126 as described in relation to the system 100. As an additional or alternative example, a standalone fixture (e.g., a pole) may be installed along or otherwise in the vicinity of a roadway to provide a fixed position for a high-confidence feature 420. The standalone fixture may be configured to communicate with computing devices in the range of a computing system attached to the standalone fixture and included in the hierarchical device-to-device positioning network such that the in-range computing devices may true out errors with respect to the standalone fixture. Such standalone fixtures may be self-sufficient or be operational with little servicing, such as by including a solar-powered battery with the standalone fixtures.

Determining whether the particular vehicle interacts with the high-confidence feature 420 may depend on particular details associated with the high-confidence feature 420. For example, interaction with a left-turn feature may be detected by a change in the speed and orientation of the particular vehicle in accordance with the general curvature and direction of the left-turn feature. Thus, a first vehicle that ignores the left-turn feature and continues to drive straight past the left-turn feature may be determined to have not interacted with the left-turn feature, while a second vehicle that makes a left turn consistent with the left-turn feature may be determined to have interacted with the left-turn feature.

As an additional or alternative example, a particular high-confidence feature 420 may be a speed zone that involves a section of a roadway that includes speed bumps and a decreased speed limit. Responsive to observing a particular vehicle has decreased its speed in accordance with the decreased speed limit and experiences one or more minor changes in elevation in accordance with the speed bumps, it may be determined that the particular vehicle has interacted with the speed zone. Accordingly, the position of the particular vehicle may be updated using the position of the speed zone, and error accumulated during operation of the particular vehicle may be trued out.

In some embodiments, truing out accumulated error associated with a particular vehicle using the high-confidence feature 420 may trigger a user device associated with the particular vehicle to send a positional message to peer devices and associated vehicles in the vicinity of the particular vehicle. Because the accumulated error associated with the particular vehicle has been trued out, the positional message of the user device may be considered very reliable and may consequently be accepted with higher priority than other nearby positional messages. As illustrated in the environment 400, for example, the vehicle 410 may send positional messages to the three closest vehicles, the vehicle 401, the vehicle 402, and the vehicle 403.

Because the positions of the vehicles 401-403 may be updated with respect to the positional message of the vehicle 410, the accumulated error associated with the positions of the vehicles 401-403 may also be decreased. Subsequent positional messages sent by the vehicles 401-403 may be considered very reliable with low accumulated error as a result. As illustrated in the environment 400, the vehicle 402 and the vehicle 403 may send positional messages with low accumulated errors to respective nearby vehicles 404 and 405. Thus, a single high-confidence feature 420 may result in decreasing the accumulated errors associated with the positions of multiple vehicles in a widespread area around the high-confidence feature 420 depending on the density of vehicles in the area.

Modifications, additions, or omissions may be made to the environment 400 without departing from the scope of the present disclosure. For example, the designations of different elements in the manner described is meant to help explain concepts described herein and is not limiting. For instance, in some embodiments, the vehicles 401-405 are delineated in the specific manner described to help with explaining concepts described herein but such delineation is not meant to be limiting. Further, the environment 400 may include any number of other elements or may be implemented within other systems or contexts than those described.

FIG. 5 is a flowchart of an example method 500 of performing hierarchical device-to-device positioning according to one or more embodiments of the present disclosure. The method 500 may be performed by any suitable system, apparatus, or computing device. For example, the position computation modules 112 and 122, the error computation modules 114 and 124, and the communication modules 116 and 126 of FIG. 1 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where a user device may receive a positional message from a peer device. In some embodiments, the user device and the peer device may be smartphones or another computing system that includes a position that may be used as a proxy for a position of a vehicle, such as an on-board computing system. The positional message may indicate a position of the peer device, which may involve a distance and an orientation of the peer device relative to the user device. Additionally or alternatively, the positional message may include an accumulated error associated with the peer device that indicates how reliable the position stated in the positional message may be based on computational error accumulating over time. Stated differently, the accumulated error may represent degrees of uncertainty regarding the computed positions and orientations of a particular computing device that increases over time. In some embodiments, the orientation or distance between the peer device and the user device may be computed based on a signal strength, an angle of arrival, or a time of arrival of a signal that corresponds to the positional message received by the user device. In some embodiments, the positional message may include a loaded navigation route vector that indicates a lane of a roadway on which the peer device was moving or is planning to move along.

At block 504, the user device may check an accumulated error included with the positional message, and at block 506, whether the accumulated error of the peer device is greater than or less than the accumulated error of the user device may be determined. In some embodiments, the accumulated error may be represented by three-dimensional volumes, such as a cube, sphere, or a prism volume, that are respectively centered on the positions of the user device and the peer device. Checking the accumulated error included with the positional message may involve comparing the accumulated error of the peer device to the accumulated error of the user device to determine which computing device includes greater accumulated error.

At block 508, the positional message of the peer device may be rejected, and a distance and orientation of the user device relative to the peer device may be assessed by the user device responsive to the accumulated error of the peer device being greater than that of the user device. At block 510, the peer device may be displayed on a map of the user device. In some embodiments, the user device may estimate the distance and orientation of the peer device based on the signal strength, an angle of arrival, or a time of arrival of the signal received by the user device. The signal strength, angle of arrival, or time of arrival may be used in addition to or as an alternative to the information provided in the positional message of the peer device. In some embodiments, the map of the user device may be a global map provided by a GPS service. Additionally or alternatively, the map of the user device may be an ad hoc map locally generated by the user device that does not rely on a GPS service or another absolute positioning system.

At block 512, the positional message of the peer device may be accepted, and a distance and orientation of the user device relative to the peer device may be assessed by the user device with consideration for the positional message of the peer device responsive to the accumulated error of the peer device being less than that of the user device.

At block 514, the user device may infer a line between the user device and the peer device corresponding to the assessed distance and the relative orientation between the two computing devices. In some embodiments, the length of the inferred line may be determined as a distance between the user device and the peer device based on the assessed distance, and the direction of the line may be determined based on the relative orientation between the user device and the peer device.

At block 516, an intersection position between the inferred line and the accumulated error of the user device may be identified, and at block 518, the position of the user device may be updated. In some embodiments, the updated position of the user device may be set at the intersection position within a bounding box corresponding to the accumulated error of the user device. Additionally or alternatively, the updated position of the user device may be set at the endpoint of the inferred line if the endpoint is within the bounding box corresponding to the accumulated error. In some embodiments, the user device may receive positional messages from more than one peer devices. Additional lines may be inferred from the additional peer devices that send positional messages to the user device, and the intersection point between some or all of the inferred lines may represent an updated position of the user device. In these and other embodiments, the accumulated error of the user device may be decreased after updating the position of the user device based on the one or more positional messages provided by the peer devices. The accumulated error of the user device may be decreased to match the accumulated error of the peer device that includes the lowest accumulated error. Additionally or alternatively, the accumulated error may be scaled based on the lowest accumulated error, computed as an average of two or more accumulated error values corresponding to two or more peer devices, or computed according to any other method.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
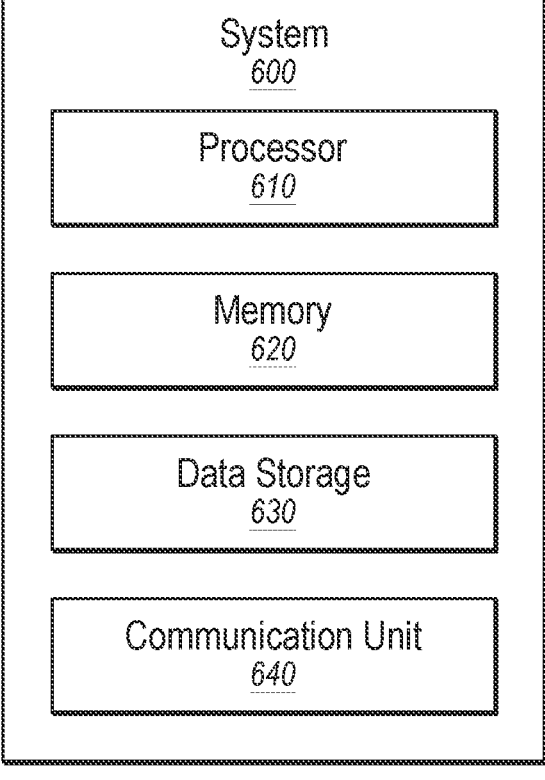
FIG. 6 is an example computing system.

FIG. 6 is an example computing system according to one or more embodiments of the present disclosure. The computing system 600 may include a processor 610, a memory 620, a data storage 630, and/or a communication unit 640, which all may be communicatively coupled. Any or all of the system 100 of FIG. 1 may be implemented as a computing system consistent with the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to cause the computing system 600 to perform the operations of the method 500 of FIG. 5. For example, the computing system 600 may execute the program instructions to receive a positional message from a peer device, check an accumulated error included with the positional message, determine whether the accumulated error of the peer device is less than that of the user device, assess a distance and an orientation of the user device relative to the peer device, and update a position of the user device.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may include information relating to the user device 110, the peer device 120, the position computation modules 112 and 122, the error computation modules 114 and 124, or the communication modules 116 and 126 of FIG. 1. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a particular operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

receiving, by a first computing device, a positional message from a second computing device, the positional message indicating a position of the second computing device in an environment and a second accumulated error of the second computing device;

comparing the second accumulated error to a first accumulated error of the first computing device, the first accumulated error and the second accumulated error represented by three-dimensional volumes that are respectively centered on positions of the first computing device and the second computing device, the first accumulated error and the second accumulated error respectively representing degrees of uncertainty regarding respective positions and respective orientations of the first computing device and the second computing device that increase over time;

responsive to the second accumulated error being lower than the first accumulated error, assessing a distance and an orientation of the first computing device relative to the second computing device; and updating a position of the first computing device in the environment based on the distance and the orientation of the first computing device relative to the second computing device.

2. The method of claim 1, wherein the positional message from the second computing device further includes an orientation of the second computing device relative to the first computing device, the orientation of the second computing device being determined based on an angle of arrival or a time of arrival of a signal corresponding to the positional message as received by the first computing device.

3. The method of claim 1, wherein the positional message of the second computing device further includes a loaded navigation route vector that indicates which lane of a roadway the second computing device is currently moving along and plans to move along.

4. The method of claim 1, further comprising decreasing the first accumulated error of the first computing device according to the second accumulated error of the second computing device after updating the position of the first computing device.

5. The method of claim 1, wherein updating the position of the first computing device comprises:

inferring a line originating from the second computing device, wherein:

a length of the line is determined according to the distance between the first computing device and the second computing device;

a direction of the line is determined according to the orientation of the first computing device relative to the second computing device; and a width of the line is determined according to the accumulated error associated with the second computing device; and setting the updated position of the first computing device at an endpoint of the line.

6. The method of claim 5, further comprising:

receiving, by the first computing device, a second positional message from a third computing device and a third positional message from a fourth computing device, the third computing device having a third accumulated error and the fourth computing device having a fourth accumulated error; and inferring a second line originating from the third computing device and a third line originating from the fourth computing device responsive to the third accumulated error and the fourth accumulated error each being lower than the first accumulated error, wherein setting the position of the first computing device is updated as an intersection point between the line, the second line, and the third line within the three-dimensional volume corresponding to the first accumulated error of the first computing device.

7. The method of claim 6, wherein the second computing device, the third computing device, and the fourth computing device are selected from a plurality of computing devices according to respective accumulated errors corresponding to each computing device of the plurality.

8. The method of claim 1, wherein the first computing device and the second computing device are smartphones.

9. The method of claim 1, wherein the first computing device and the second computing device are infotainment systems respectively integrated with a first vehicle and a second vehicle.

10. A system, comprising:

one or more processors; and one or more non-transitory computer-readable storage media configured to store instructions that, in response to being executed, cause the system to perform operations, the operations comprising:

receiving, by a first computing device, a positional message from a second computing device, the positional message indicating a position of the second computing device in an environment and a second accumulated error of the second computing device;

comparing the second accumulated error to a first accumulated error of the first computing device, the first accumulated error and the second accumulated error respectively represented by three-dimensional volumes that are respectively centered on positions of the first computing device and the second computing device, the first accumulated error and the second accumulated error respectively representing degrees of uncertainty regarding respective positions and respective orientations of the first computing device and the second computing device that increase over time;

responsive to the second accumulated error being lower than the first accumulated error, assessing a distance and an orientation of the first computing device relative to the second computing device; and updating a position of the first computing device in the environment based on the distance and the orientation of the first computing device relative to the second computing device.

11. The system of claim 10, wherein the positional message from the second computing device further includes an orientation of the second computing device relative to the first computing device, the orientation of the second computing device being determined based on an angle of arrival or a time of arrival of a signal corresponding to the positional message as received by the first computing device.

12. The system of claim 10, wherein the positional message of the second computing device further includes a loaded navigation route vector that indicates which lane of a roadway the second computing device is currently moving along and plans to move along.

13. The system of claim 10, further comprising decreasing the first accumulated error of the first computing device according to the second accumulated error of the second computing device after updating the position of the first computing device.

14. The system of claim 10, wherein updating the position of the first computing device comprises:

inferring a line originating from the second computing device, wherein:

a length of the line is determined according to the distance between the first computing device and the second computing device;

a direction of the line is determined according to the orientation of the first computing device relative to the second computing device; and a width of the line is determined according to the accumulated error associated with the second computing device; and setting the updated position of the first computing device at an endpoint of the line.

15. The system of claim 14, further comprising:

receiving, by the first computing device, a second positional message from a third computing device and a third positional message from a fourth computing device, the third computing device having a third accumulated error and the fourth computing device having a fourth accumulated error; and inferring a second line originating from the third computing device and a third line originating from the fourth computing device responsive to the third accumulated error and the fourth accumulated error each being lower than the first accumulated error, wherein setting the position of the first computing device is updated as an intersection point between the line, the second line, and the third line within the three-dimensional volume corresponding to the first accumulated error of the first computing device.

16. The system of claim 15, wherein the second computing device, the third computing device, and the fourth computing device are selected from a plurality of computing devices according to respective accumulated errors corresponding to each computing device of the plurality.

17. The system of claim 10, wherein the first computing device and the second computing device are smartphones.

18. The system of claim 10, wherein the first computing device and the second computing device are infotainment systems respectively integrated with a first vehicle and a second vehicle.

\* \* \* \* \*